E. C. HEAD.
METHOD OF PRODUCING GEARS.
APPLICATION FILED SEPT. 8, 1916.

1,262,192.

Patented Apr. 9, 1918.
3 SHEETS—SHEET 1.

INVENTOR
ERNEST C. HEAD
BY
Edward R. Inman
ATTORNEY

E. C. HEAD.
METHOD OF PRODUCING GEARS.
APPLICATION FILED SEPT. 8, 1916.

1,262,192.

Patented Apr. 9, 1918.

SEE FIG. 2.

SEE FIG. 9.

INVENTOR
ERNEST C. HEAD
BY
*Edward R. Inman*
ATTORNEY

E. C. HEAD.
METHOD OF PRODUCING GEARS.
APPLICATION FILED SEPT. 8, 1916.

1,262,192.

Patented Apr. 9, 1918.
3 SHEETS—SHEET 3.

FIG.5.  20 AND 25 TEETH – RATIO 1 TO 8
       8 THREADS PER INCH
       20° 22'

FIG.6.  18 AND 20 TEETH – RATIO 1 TO 9
       9 THREADS PER INCH
       37° 40'

FIG.7.  24 AND 24 TEETH – RATIO 1 TO 10
       10 THREADS PER INCH
       SPUR

FIG.8.  22 AND 20 TEETH – RATIO 1 TO 11
       11 THREADS PER INCH
       28° 57'

FIG.9.  23 AND 20 TEETH – RATIO 1 TO 11½
       11½ THREADS PER INCH
       26° 24'

FIG.10. 24 AND 20 TEETH – RATIO 1 TO 12
       12 THREADS PER INCH
       23° 34'

FIG.11. 26 AND 20 TEETH – RATIO 1 TO 13
       13 THREADS PER INCH
       16° 37'

FIG.12. 28 AND 20 TEETH – RATIO 1 TO 14
       14 THREADS PER INCH
       SPUR

FIG.13. 27 AND 18 TEETH – RATIO 1 TO 15
       15 THREADS PER INCH
       20° 22"

ALL THE ABOVE PAIRS OF GEARS ARE
CUT WITH AN 8 DIAMETRAL PITCH CUTTER
AND ARE ADAPTED TO BE MOUNTED UPON
SHAFTS HAVING A FIXED-CENTER DISTANCE OF THREE INCHES.
ANY OTHER SUITABLE PITCH MAY BE EMPLOYED

CHANGE GEARS EACH HAVING 24 TEETH
NORMAL RATIO OF FEED-TRAIN 1 TO 10
FEED-SCREW ¼" LEAD
FIXED CENTER DISTANCE

FIG.14.

INVENTOR
ERNEST C. HEAD
BY Edward R. Inman
ATTORNEY

UNITED STATES PATENT OFFICE.

ERNEST C. HEAD, OF FRANKLIN, PENNSYLVANIA, ASSIGNOR TO COLBURN MACHINE TOOL COMPANY, OF FRANKLIN, PENNSYLVANIA, A CORPORATION OF PENNSYLVANIA.

METHOD OF PRODUCING GEARS.

1,262,192.  Specification of Letters Patent.  Patented Apr. 9, 1918.

Continuation of application Serial No. 75,380, filed January 31, 1916. This application filed September 8, 1916. Serial No. 119,113.

*To all whom it may concern:*

Be it known that I, ERNEST C. HEAD, citizen of the United States, residing at Franklin, in the county of Venango and State of Pennsylvania, have invented certain new and useful Improvements in Methods of Producing Gears, of which the following is a specification.

The object, application and utility of my improved system of change gearing and method of producing the same, together with certain examples of gears from a system of gearing which has been produced through the practical development and application of my inventive idea, are herein set forth with sufficient clearness to enable those skilled in the art of gear-making to make and use the same.

My improved system of gearing is adapted to be applied to all classes of machine-tools which are adapted to perform such operations as thread-cutting, tapping, gear-cutting, graduating, indexing, etc., and among such classes of machine-tools may be mentioned lathes, boring and turning mills, gear-cutting machines, drill presses, graduating machines, etc., also any other mechanical appliance that requires a number of accurate gear-ratio changes.

Machines of the classes mentioned are provided with various systems of change gears whereby the proper ratio of feed, movement or action of the work-tool is produced with relation to the movement of the work to be operated upon.

All of such systems of change gearing, heretofore produced and employed, involve the use of one or more intermediate gears that are carried by an adjustable bracket, lever, stud, pin or some equivalent element, and this intermediate gear, or gears, as the case may be, is employed to transmit motion from one change gear to another. This arrangement has been employed simply because it has not heretofore been discovered that it is possible to produce a practical system of change gears composed of directly coöperating or intermeshing gears that may be mounted upon shafts or equivalent elements having fixed or non-adjustable center-distances, and also without the employment of any supplementary or intermediate gear or gears, as above indicated.

I have discovered that, by the employment of a system of gears, which is composed wholly or partially of gears of a helical type, and the observance of properly determined and suitable angles in forming the teeth of the helical portion of the gears of such system, a system of change gearing may be developed, consisting of pairs of intermeshing gears for each change of ratio employed, all of which pairs of gears are adapted to conform to and to maintain the same and a fixed center distance between the shafts or other carrying elements upon which said pairs of gears are mounted, and, in addition thereto, said system dispenses with the intermediate gears and their coöperating adjusting elements which have heretofore been employed.

In the accompanying drawings which form a part hereof, and as an illustration of one way in which my inventive idea may be practically embodied and utilized, I have shown the adaptation of a system of my change gearing to an engine lathe, whereby such lathe is adapted to cut the various screw-threads most commonly employed in actual practice: It should be understood, however, that said drawings show one example merely of the utility and application of my inventive idea, and are not intended to, in any way, limit the field of its application, since, as previously stated, the system is applicable to many different classes of machines and mechanical appliances; furthermore, a cutter of any other pitch than that specifically mentioned,—8 diametral pitch—may be employed in producing in whole or in part a system of gears in accordance with my invention.

The various figures in said drawings are as follows.

Figs. 5, 6, 7, 8, 9, 10, 11, 12 and 13, together with the explanatory notes relating thereto respectively, each show a coöperating pair of gears adapted to produce a proper ratio for cutting one of the screw-threads most commonly employed in the mechanical arts.

Figures 1, 2:
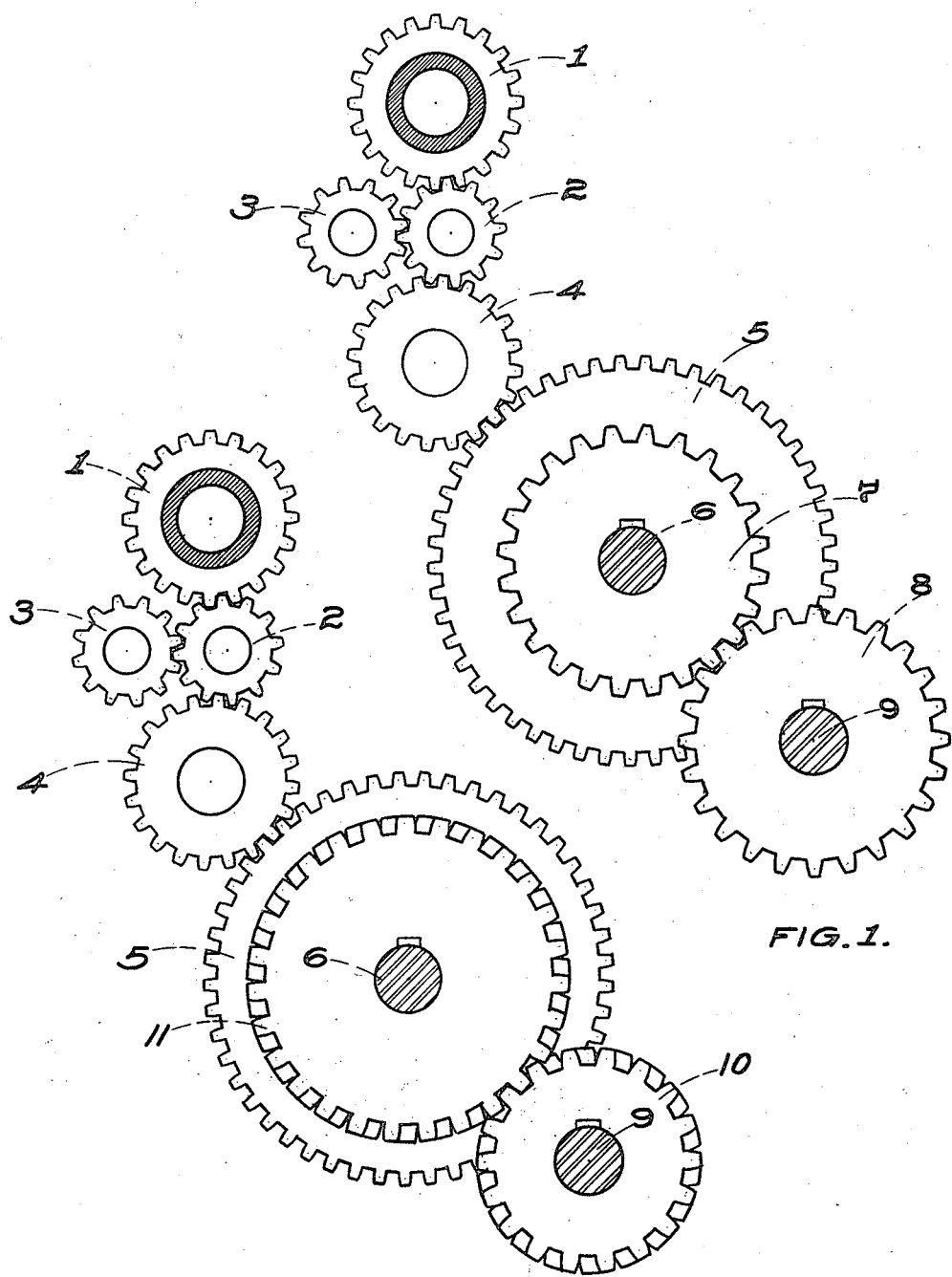
Figure 1 is an elevation of a train of feed gears of an engine lathe with a pair of my change gears applied thereto.
Fig. 2 is an elevation of said train with a pair of change gears applied thereto in accordance with my inventive idea, and which are of a different ratio from those shown in Fig. 1.

Fig. 14 is an elucidated diagram of the feed train shown in Fig. 1.

Referring to the train of gears shown in Fig. 1, the gear 1 is carried by the spindle of the lathe, and is shown as having twenty teeth; from said gear 1, motion is transmitted through the intermediate gears 2 or 3 and 4 to the gear 5, which is shown as having 50 teeth; hence, the ratio between said gears 1 and 5 is one to two and one-half: Said gear 5 is keyed to shaft 6 and drives the same; removably keyed to said shaft 6 is one of the gears 7 of a pair of gears which compose a portion of my system of gearing; the other member 8 of said pair of gears is removably keyed to and adapted to drive the feed-screw 9 of the lathe. Said gears 7 and 8 each have 24 teeth and are of equal ratio; the thread of said feed-screw 9 has a lead of one-quarter of an inch, or one inch to each four revolutions, and this produces a ratio of one-to-ten between the spindle and said feed-screw. This means that ten revolutions of said spindle will cause the carriage of the lathe, and the thread-forming tool which is carried thereby, to travel one inch, and would, therefore, be suitable for cutting ten threads per inch.

From the above description, it will now be readily understood that we have in the feed-train of gearing shown in Fig. 1, a normal or constant ratio of one-to-ten. It need scarcely be said, however, that this would not be the case in every lathe, because the feed-screws of different lathes have different leads, but my system of gearing can be readily adapted to conform to any such varying conditions.

The screw-threads most commonly employed in the mechanical arts are as follows: 8, 9, 10, 11, 11½, 12, 13, 14 and 15 threads per inch.

For the purpose of cutting these various threads, I provide a system of gears consisting of pairs of intermeshing gears for each variation of ratio, and these pairs of gears are adapted to be interchangeably mounted upon said shafts 6 and 9, and to thus vary said normal ratio of one-to-ten so that ratios suitable for cutting the above-specified threads will be produced. My system of gears may be developed to cut any other number of threads per inch in addition to those above stated.

The change gears used for cutting said commonly-employed threads are shown in Figs. 5 to 13 of the drawings, and it will be noted that the greater portion of these gears are of the helical type; all of the gears here shown have been systematically developed so that they may be cut with one, and the same cutter. If spur gears were to be used for this purpose, odd and fractional pitches would have to be employed, and it would be necessary to make a special cutter for nearly every pair of gears that were required.

My inventive idea resides in the fact that, by employing the helical type of gear for the purpose stated, I am enabled to produce, by means of cutters of standard, commercial i. e. stock pitches, all of the various pairs of gears necessary to obtain all the required variations of ratio which may be called for in actual practice.

Each of said Figs. 5 to 13 shows a pair of intermeshing gears which will produce a specific modification of said one-to-ten ratio. Many other illustrations could be given, but those shown are deemed sufficient to clearly illustrate the nature and scope of my inventive idea.

Figure 3:
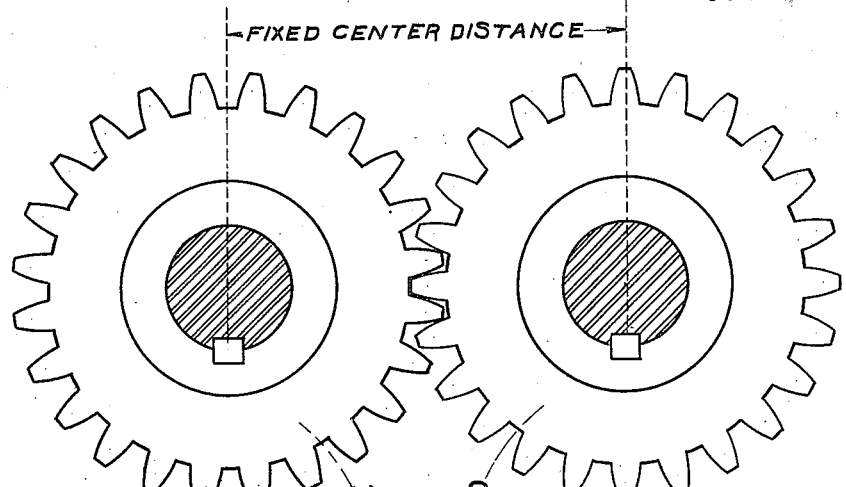
Figs. 3 and 4 show, respectively, a coöperating pair of gears which constitute a portion of the system herein set forth.
Figure 4:
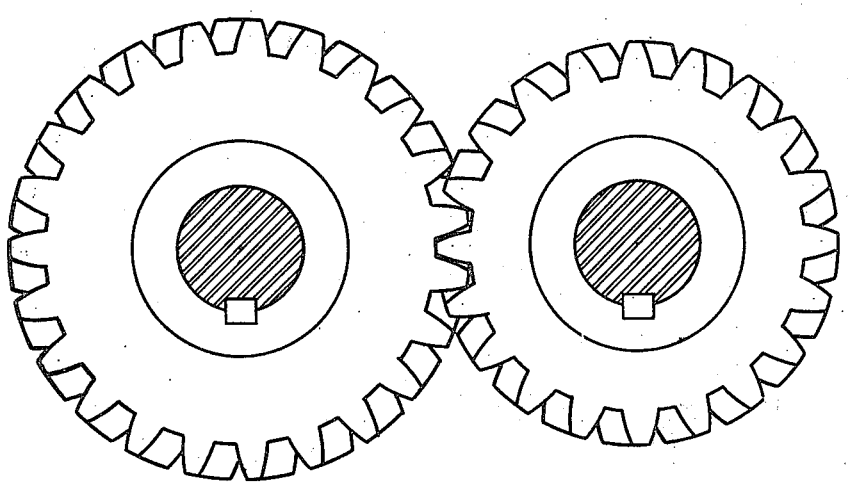

Gears 7 and 8 of Fig. 1 are the gears that are diagrammatically illustrated in Fig. 7, and said pair of gears is also shown in elevation in Fig. 3; these as previously stated are a pair of spur gears each having 24 teeth. In Fig. 4 I have shown in elevation the pair of helical gears diagrammatically illustrated in Fig. 9. In Fig. 2 of the drawings, the gears 10 and 11 are the gears diagrammatically illustrated in Fig. 13, this being a pair of helical gears having 18 and 27 teeth respectively with a helix angle of 20° 22′, to the axes of the gears.

A cutter or cutters of any commercial or standard pitch or pitches may be used to cut the gears for my system of gears, and, in actual practice, the selection of a suitable pitch would be determined by substantially the same factors and conditions that would determine the selection of pitches in making spur gears, through, for obvious reasons, a greater range of selection is possible with gears of the helical type.

Having thus set forth certain specific examples of the embodiment of my inventive idea, it may be readily understood that said idea resides in the discovery and fact that the helical type of gear is not only adapted to be employed for the purpose set forth, but in addition thereto, that it is much better adapted to be so employed than is the spur type of gear; that it is possible to produce a system of gears of the helical type for the purpose set forth with commercial or stock cutters: Whereas, and upon the other hand, if the spur type of gear were to be employed without the use of some adjusting devices, special cutters of fractional and odd pitches would have to be provided for cutting said spur gears. That such a spur-gear system is not considered a commercial possibility is evident from the many devices which have heretofore been employed to obviate the necessity of employing a spur-gear system.

It will be noted that, in the development of a system of gears in accordance with my invention, there may occur, at certain intervals in the system, a pair of spur gears, but these are due to the logical and scientific development of the system, and, when taken in connection with the other members in said system, they form a part thereof.

In the system here illustrated and described, a fixed center distance of 3″ is observed and maintained between the shafts 6 and 9 upon which my pairs of change gears are mounted, and all the gears in this system are cut with an 8 diametral pitch cutter: In said system the gears shown in Figs. 7 and 12 are spur gears. If, however, said center distance should be changed to 3.15″, then all of the gears in the system would be of the helical type.

I call attention to the fact that the gears comprising such a system as I have here shown and described, could be produced by the process of casting, and it should be understood that a system so produced would be as fully within the scope of my invention as cut gears would be; furthermore, and inasmuch as herring-bone gears are, or may be, double helical gears, my inventive idea may be readily embodied in this type of gear.

I claim the following:

1. The method of producing a system of pairs of intermeshing change gears of different ratios for use on two shafts having fixed centers when some or all of said gears are of such pitch diameters that spur gears cannot be cut with stock cutters to produce the selected ratios, which consists in selecting gears of the helical type, determining the angles at which the teeth of gears of the respective ratios may be cut by a single cutter, and cutting the teeth of said pairs of gears at said angles and with said cutter.

2. The method of producing a system of pairs of intermeshing change gears of different ratios for use on two shafts having fixed centers when some or all of said gears are of such pitch diameters that spur gears cannot be cut with stock cutters to produce the selected ratios, which consists in cutting the teeth of all of said gears with a single cutter at the angles respectively required by said ratios and the pitch of said cutter.

3. The method of producing a system of pairs of intermeshing change gears of different ratios for use on two shafts having fixed centers when some or all of said gears are of such pitch diameters that spur gears cannot be cut with stock cutters to produce the selected ratios, which consists in selecting gears of the helical type, determining the angles at which the teeth of gears of the respective ratios may be cut by stock cutters, and cutting therewith the teeth of said pairs of gears at said respective angles.

4. The method of producing a system of pairs of intermeshing change gears for use on two shafts having fixed centers, which consists in determining the ratio of the gears of each pair to secure a predetermined result, determining the number of teeth of the gears of each pair that may be cut with a cutter of given pitch to secure the respective ratio, determining the angle of the teeth required by said number of teeth and the pitch of said cutter, and cutting the teeth of said gears with said cutter and at said determined angle.

5. The method of producing a system of pairs of intermeshing change gears of different ratios for use upon two shafts having fixed centers, which consists in selecting a plurality of different speeds to be produced by said gears, determining the ratios of the pairs of gears to produce the respective speeds, selecting gears of the helical type when a pair of gears cannot be cut as spur gears with a stock cutter, determining the helix angle and the number of teeth of each such pair of gears whereby it may be cut with a stock cutter, and cutting said pairs of gears in accordance with said determinations.

6. The method of making each of a system of pairs of intermeshing change gears of different ratios for use on two shafts having fixed centers when said pair of gears are of such pitch diameter that spur gears cannot be cut with a stock cutter to produce the selected ratio, which consists in selecting gears of the helical type, determining the helical angle required by said ratio and the pitch of a stock cutter in order to cut said gears with said cutter, and then cutting the teeth of said pair of gears with said cutter and at said angle.

7. The method of producing a system of pairs of intermeshing change gears of different ratios for use on two shafts having fixed centers when some or all of said gears are of such pitch diameters that spur gears cannot be cut with stock cutters to produce the selected ratios, which consists in cutting the teeth of each pair of said gears with a cutter of stock pitch and at the angle required by the pitch of said cutter and the ratio of said pair of gears.

8. The method of producing a system of pairs of intermeshing change gears for use on two shafts having fixed centers, which consists in determining the ratio of each pair of gears to secure a desired result, determining the angle and number of teeth of the gears of each pair whereby said gears may be cut with a cutter of stock pitch to produce the selected ratio, and cutting the teeth of said pair of gears with said cutter and at said angle.

9. The method of producing a system of pairs of intermeshing change gears for use on two shafts having fixed centers, which consists in determining the ratios of said pairs of gears whereby to secure the desired results, determining the angle and number of teeth of the gears of the respective pairs whereby said gears may be cut by a single cutter to produce the selected ratios, and cutting the teeth of said pairs of gears with said cutter and at the determined angles.

In testimony whereof I affix my signature in presence of two witnesses.

ERNEST C. HEAD.

Witnesses:
E. R. INMAN,
WINIFRED S. ALLING.